Figures 1, 2:
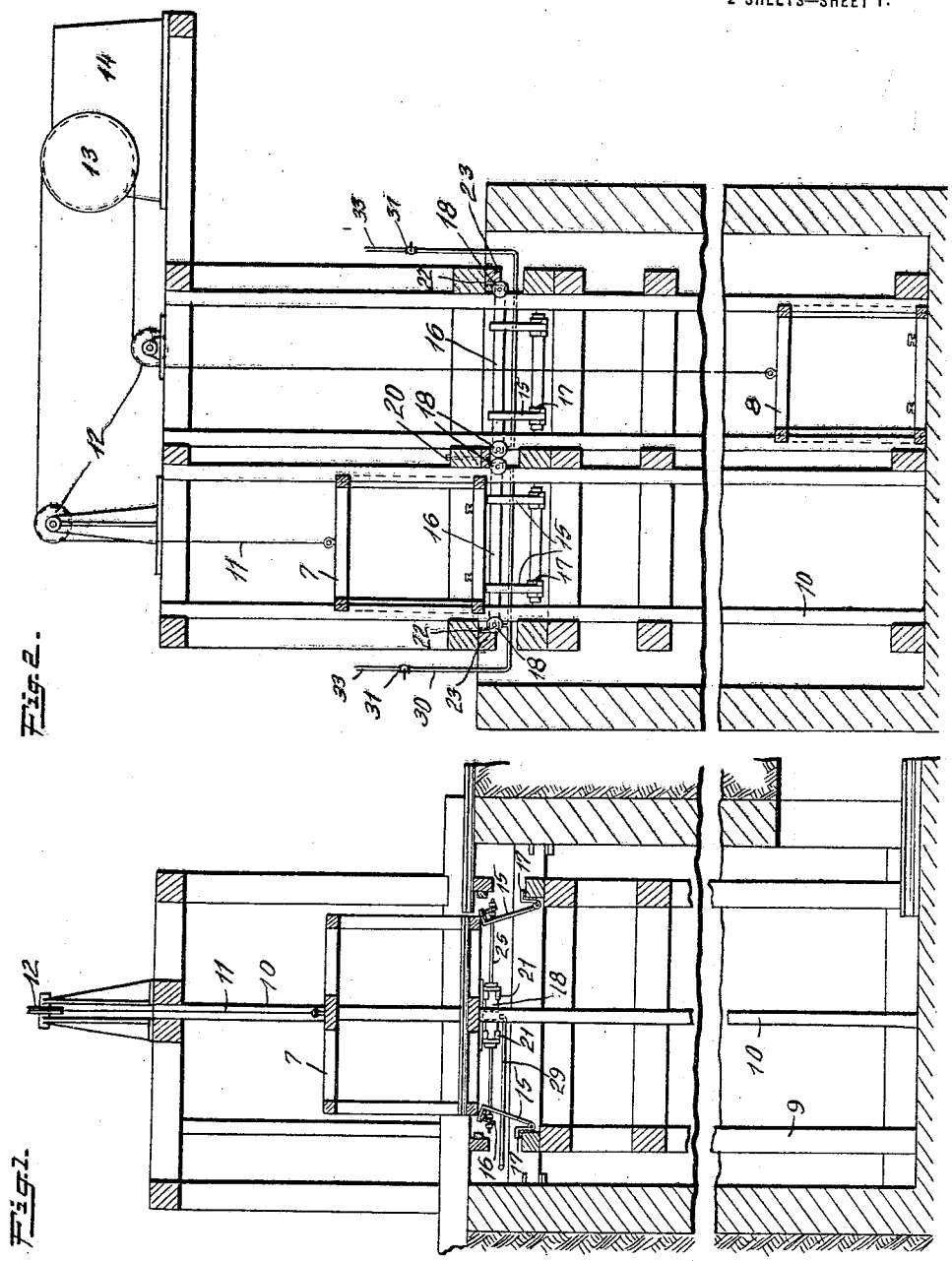

W. O. BORCHERDT.
ELEVATOR.
APPLICATION FILED APR. 27, 1917.

1,297,992.

Patented Mar. 25, 1919.
2 SHEETS—SHEET 1.

Inventor
W. O. Borcherdt,
By his Attorneys

W. O. BORCHERDT.
ELEVATOR.
APPLICATION FILED APR. 27, 1917.
1,297,992.
Patented Mar. 25, 1919.
2 SHEETS—SHEET 2.
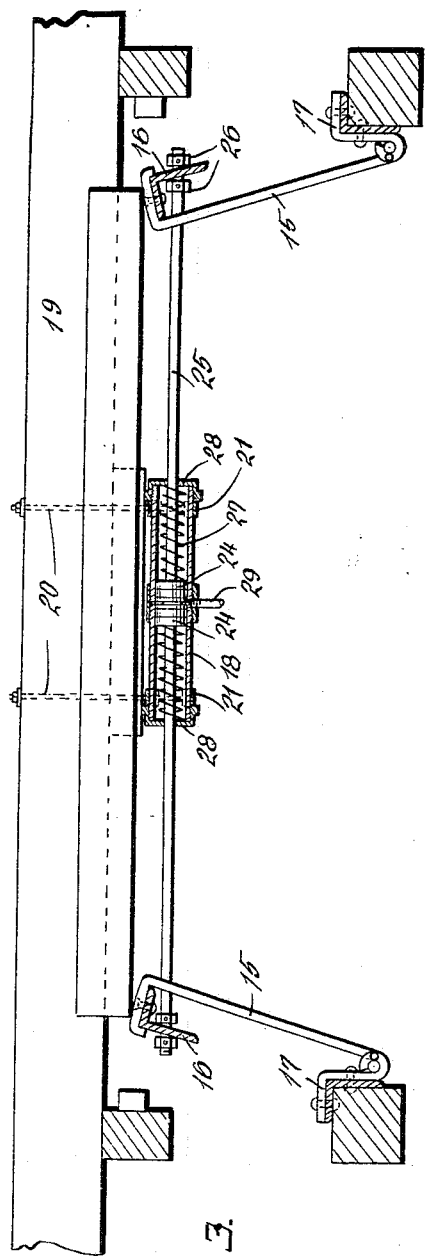
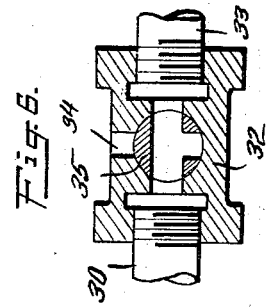
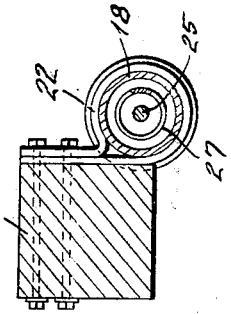
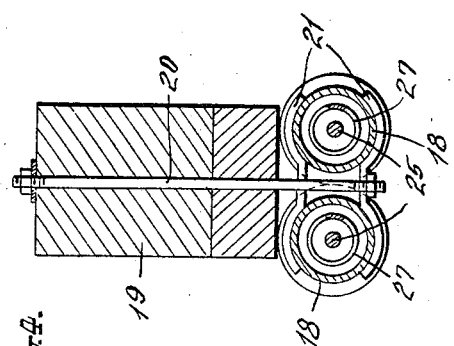
Inventor
W. O. Borcherdt,
By his Attorneys.

UNITED STATES PATENT OFFICE.

WALTER O. BORCHERDT, OF AUSTINVILLE, VIRGINIA.

ELEVATOR.

1,297,992.      Specification of Letters Patent.      Patented Mar. 25, 1919.

Application filed April 27, 1917. Serial No. 164,844.

*To all whom it may concern:*

Be it known that I, WALTER O. BORCHERDT, a citizen of the United States, residing at Austinville, in the county of Wythe, State of Virginia, have invented certain new and useful Improvements in Elevators; and I do hereby declare the following to be a full, clear, and exact description of the invention, such as will enable others skilled in the art to which it appertains to make and use the same.

This invention relates to elevators of the type in which the ends of the elevator cable are secured to two cages to raise and lower the cages in their respective shafts, the intermediate portion of the cable being carried around a power-operated winding drum. The invention is of special utility in mine-shaft elevators and will be described herein as so used, though it will be understood that the invention is not limited in its application to this use.

In installations of such mine shaft elevators handling two cars in balance, it is usual to provide landing chairs or supports for the cages at the points where the cages are stopped to discharge or take on their loads. In the operation of such installations, the common practice heretofore has been to hoist the ascending cage slightly beyond the station landing chairs which open automatically to allow the cage to pass and then fall back into position to receive the cage which is slacked back by its unbalanced weight. Ordinarily this slacking back of the cage upon the supports can be effected by manipulation of the brakes which coöperate with the winding drum, leaving the hoisting engine set to rotate in the same direction; but at times a slight over-wind or lack of unbalanced weight make it necessary to reverse the engine and "crack" the throttle to effect the landing. After the engine has been so reversed and when it is desired to lower the cage again, it is necessary to again reverse the engine in order to raise the cage off the landing chairs or landing dogs, as they are sometimes called, so as to permit these dogs to be withdrawn and then the engine must be again reversed to permit the car to move downward and to raise the other car.

This procedure involves a number of practical objections. When the cage is raised off the landing dogs to permit them to be withdrawn manually, the skill of the hoistman and the condition of the mechanical equipment become important factors. A sticky throttle, careless manipulation, brakes which seize slightly or any one of a number of other causes may result in the car being jerked upward and elevated farther than is proper, and the upward movement may even go so far as to require an application of the brakes to prevent a dangerous over-wind. Even when lifting of the cage off the dogs is performed properly, the procedure involves transferring all of the slack to the long end of the cable; then when the engine is reversed and operated in the reverse direction to lift the cage attached to the long end of the cable, this slack is taken up with more or less snap, depending upon the amount of slack, the velocity of the movement and the weight of the cage. The strain thus thrown upon the long end of the cable may frequently be much greater than the cable is intended to withstand and this may account for a substantial portion of the wear and breakage of cables, particularly that occurring near the ends of the cables where these strains would have their greatest effect.

The present invention is directed to the provision of an improved form of apparatus whereby these objectionable characteristics of the procedure heretofore followed are eliminated. In accordance with the invention, landing chairs or dogs are mounted at the points where the cages are to be stopped and means are provided for withdrawing these chairs to their inoperative positions without requiring that the cage be first lifted off of them. Preferably, the chairs are pivotally mounted so that they will be moved to their inoperative positions by the cage to permit the cage to pass, and springs are provided for moving the chairs back to their operative positions so that they will support the cage when the latter is lowered upon them. Also, power-operated devices are provided, preferably in the form of pneumatic cylinders and pistons for moving the chairs to their inoperative positions when it is desired to lower the cage without requiring that the cage be first raised to remove the weight of the cage from the chairs.

One of the principal advantages secured by the use of this mechanism is that when the ascending cage has been landed upon the chairs in the usual manner, the hoisting engine may be reversed at once and it is then ready for the next hoist. If the ascending cage be lifted slightly above the chairs, it may usually be slacked back upon them and the engine may then be reversed to put it in condition for the next wind. But whether the engine be reversed to lower the lifted cage upon the chairs or reversed merely for the purpose of putting it in condition for the next hoist, it does not have to be reversed again for the purpose of lifting the cage off of its chairs to permit withdrawal of the chairs preparatory to the descent of the cage past them. In other words, in preparing to lower the lifted cage, there is no danger of an over-wind accident, since the engine is started in the position required for raising the lower cage.

Another advantage incident to the use of my improved apparatus is that when the lifted cage is released by withdrawing the supporting chairs from under it, it drops slightly until it is caught without shock by the springs forming part of the usual safety devices and the strain incident to so catching the cage slips the brakes of the winding drum slightly, thus gently taking up the slack in the long end of the cable. The result is to impose a slight strain on the entire length of cable in a direction corresponding to the direction of operation of the engine in effecting the next hoist and in practice the withdrawal of the supporting chairs and the commencement of the operation of the engine to effect the next hoist may take place so nearly simultaneously that the downward movement of the lifted car when its supporting chairs are withdrawn is not substantially checked.

The features of the invention will be better understood by reference to the following description taken in connection with the accompanying drawings which illustrate the preferred embodiment of my invention. In these drawings, Figure 1 is a sectional elevation of a mine shaft elevator mechanism; Fig. 2 is a view similar to Fig. 1 on a plane at right angles to the plane of Fig. 1; Fig. 3 is a sectional elevation of a pair of landing chairs and the operating mechanism therefor; Figs. 4 and 5 are sectional detail views illustrating the supports for the pneumatic cylinders; and Fig. 6 is a sectional view of the control valve.

Referring to these drawings, Figs. 1 and 2 show a pair of mine shafts for elevator cages. The cages are shown at 7 and 8 and they may be of the usual or any suitable construction. Each shaft is provided with suitable side rods 9 and also with a pair of guides 10 arranged opposite each other and the cage has shoes mounted thereon which coöperate with the guides 10 to guide the cage in its vertical movement. The ends of the hoisting cable or rope 11 are secured to the two cages 7 and 8; intermediate its ends it passes over suitable sheaves 12 and is carried around the winding drum 13 which is operated by an engine indicated diagrammatically at 14.

At each of the landings for each of the cages is a pair of landing chairs or dogs and these chairs are pivotally mounted so that they may be moved away from each other to an inoperative position to permit the cage to pass and may be moved toward each other to an operative position in which they will serve as supports for supporting the cage at the landing. Each chair is shown as consisting of a pair of pivotally mounted dogs 15 having their free ends riveted to a strip of angle iron 16. The lower ends of the dogs are pivotally connected to hinge members 17 which are mounted upon the framing of the shaft, as is indicated in Fig. 3.

The operating mechanism for each pair of chairs consists of springs acting on the chairs to turn them on their pivots in the direction to carry their free ends toward each other and a pair of pneumatic cylinders with pistons therein whereby the chairs may be turned on their pivots to carry their free ends away from each other to the inoperative positions. The two cylinders 18 are mounted at opposite sides of the path of movement of the cage. Where the two shafts are side by side as illustrated in Fig. 2, two of the pneumatic cylinders 18 are mounted between the two shafts and are suspended from a beam 19 by a hanger consisting of a rod 20 passing through the beam and clamping members 21 through which the rod 20 passes and which grips the cylinders 18 on opposite sides thereof, as shown in Fig. 4. One cylinder 18 is mounted on the opposite side of each of the two shafts and it may be supported by an encircling strap 22 secured to a supporting beam 23, as shown in Fig. 5. Within each cylinder are two pistons 24 and a piston rod 25 of each piston extends through one end of the cylinder 18 and is connected at its end to the angle iron 16 of the landing chair. For this purpose the end of each rod 25 is threaded to receive nuts 26 which lie on opposite sides of the web of the angle iron 16. Within each end of the cylinder 18 is a coil spring 27, one end of which bears on the piston 24 and the other end of which bears upon the cap 28 which closes the end of the cylinder and is secured thereto by coacting threads. A pipe 29 enters each cylinder 18 at the center thereof between the two pistons 24. The pipes 29 for the two pistons of each shaft are connected together and to an air conduit 30 which has a valve 31 therein at a position convenient for the operator. The valve 31 is a two-way valve of any suitable construction, such as is indicated in Fig. 6, wherein the valve casing 32 is shown as having the pipe 30 entering one end thereof and a compressed air supply pipe 33 entering the opposite end. The casing 32 is provided with an outlet 34 to the atmosphere and also with a movable valve member 35 which may be moved to the position in which it is shown in Fig. 6 for connecting the pipes 33 and 30 or to a position 90° displaced from that shown so as to connect the pipe 30 to the port 34 leading to the atmosphere.

When the cage is raised and approaches the landing position, it engages the dogs 15 of the landing chairs and moves the two chairs about their pivots to their inoperative positions to permit the cage to pass. This outward movement of the chairs is accompanied by movement of the rods 25 and pistons 24 away from each other, thereby compressing the springs 27 between the pistons 24 and the caps 28 of the cylinders. By adjustment of the positions of the caps 28 upon the ends of the cylinder, the tension of the springs 27 may be regulated as desired. As soon as the car has been lifted above the chairs, the latter are turned about their pivots to carry their free ends toward each other by the tension of the springs 27. This movement carries the chairs to their operative positions under the car so that they will serve as supports for the car and the latter may be lowered upon them by slacking the brakes of the winding drum or if necessary by reversing the engine.

When it is desired to lower the car, the operator turns the movable member 35 of the controlling valve 31 to the position in which it is shown in Fig. 6, thereby connecting the compressed air supply pipe 33 to the pipe 30 leading to the connections 29 to the two cylinders 18 of the chairs supporting the car. The admission of compressed air to these cylinders causes the pistons therein to be moved away from each other against the tension of the springs 27, thereby forcing the chairs from their operative positions away from each other to their inoperative positions in which they no longer serve as supports for the car. Preferably the upper ends of the dogs 15, that is the portions of the chairs upon which the cage rests when it is supported by the chairs, are curved about the pivots of the dogs as centers. This facilitates the operation of withdrawing the chairs from their supporting positions under the car. If desired, the supporting faces of the dogs 15 may be retreating so that the withdrawal of the dogs may be even more readily accomplished. When the chairs are withdrawn, the cage previously supported thereby is dropped and its downward movement may be arrested without excessive jar after it has moved but a very slight distance, the checking of the downward movement of the car being eased by the springs forming part of the usual safety devices, which springs act like the draw-bar springs of a railway car. Also, when the car is so dropped, the brakes on the winding drum slip slightly so that all the slack in the long end of the cable is taken up and the cable is subjected to a strain throughout its length is a direction corresponding to the direction of the next hoisting movement of the engine. Preferably, the engine is started in operation practically simultaneously with the withdrawal of the dogs from under the car so that the downward movement of the car which starts when the chairs are withdrawn is practically continuous. After the car has been lowered beyond the supporting chairs, the operator turns the movable member of the valve 31 to the position for connecting the pipe 30 to the port 34 leading to the atmosphere so that the pistons 24 and the landing chairs connected thereto may be moved by the springs 27 to carry the chairs to their inward or operative position, the air in the cylinders 18 being then exhausted through the pipes 29 and 30 and the exhaust port 34.

It will be noted that the two landing chairs for supporting a car in the landing position extend parallel to each other along opposite sides of the path of movement of the car, and also, that the operating mechanism for moving the landing chairs is applied to opposite ends of the chairs, the two operating mechanisms for a pair of chairs being mounted upon opposite sides of the path of movement of the car. In other words, the operating mechanism is applied to the four corners of the supporting structure. The springs by which the chairs are moved to their inward or operative position are given considerable tension, this tension being subject to adjustment by manipulation of the caps 28. The purpose of this is to insure that even if the car be dropped upon the supporting chairs accidentally with much greater force than the chairs should be subjected to, there will be no danger of the chairs being forced apart to their inoperative positions to allow the car to pass. The construction is such that the tension of the springs is applied to the four corners of the supporting structure for the car, just as is the force applied by the operating mechanism for moving the chairs to their inoperative positions.

The improved form of landing chairs with their operating mechanisms is shown as installed at the landing at the top of a pair of mine shafts. It will be understood, however, that the same construction can be employed at the bottom landings if desired and also at intermediate landings.

In mine shaft installations such as that indicated in Figs. 1 and 2, a supply of compressed air is usually available but it is quite common for this air pressure to vary within rather wide limits. Under such conditions the preferred practice is to make the cylinders and pistons large enough to insure operation under low pressure conditions; then when the pressure is high, the operator, in manipulating the valve 31, would hold the movable valve member in the position for connecting the air supply to the cylinders for only a very short space of time. Lubricating oil may be readily supplied to the interiors of the pneumatic cylinders by introducing the oil into the controlling valve 31 at the port therein leading to the atmosphere; such lubricant would readily work down from the controlling valve into the cylinders.

I claim:

1. In an elevator, the combination with the shaft and the car movable therein, of a pair of chairs pivotally mounted opposite each other and arranged to occupy a position for supporting the car at a landing and to be turned about their pivots into a non-supporting position with respect to the car, and motive fluid operating means mounted intermediate said pair of chairs and including a pair of piston rods connected to said chairs so as to effect corresponding movements of the chairs upon the admission of motive fluid to said means; substantially as described.

2. In an elevator, the combination with the shaft and the car movable therein, of a pair of pivotally mounted landing chairs for supporting the car at a landing and arranged to be turned about their pivots from a car-supporting position into a non-supporting position with respect to the car, an operating rod connected to each of said chairs, and motive means positioned intermediate said pair of chairs and operatively connected to said rods so as to reciprocate the rods and thereby effect corresponding movements of the chairs; substantially as described.

3. In an elevator, the combination with the shaft and the car movable therein, of a pair of chairs pivotally mounted opposite each other and arranged to occupy a position for supporting the car at a landing and to be turned about their pivots into a non-supporting position with respect to the car, a cylinder mounted intermediate said pair of chairs, a pair of pistons operatively associated with said cylinder, a piston rod operatively connected between each of said pistons and its coöperating chair, means for admitting a motive fluid to said cylinder for causing said pistons to move said chairs from their car-supporting positions into their non-supporting positions with respect to the car, and means associated with said pistons and coöperating therewith for automatically returning said chairs to their car-supporting positions upon the exhaust of the motive fluid from said cylinder; substantially as described.

4. In an elevator, the combination with the shaft and the car movable therein, of a landing chair for supporting the car at a landing mounted for movement and adapted to be moved by the car to inoperative position to permit the car to pass, a cylinder, a piston therein connected to the chair, and a source of motive fluid connected to the cylinder for actuating the piston therein to move the chair to its inoperative position while the car is resting upon the chair; substantially as described.

5. In an elevator, the combination with the shaft and the car movable therein, of a pair of landing chairs pivotally mounted opposite each other on opposite sides of the shaft, a pair of cylinders mounted on opposite sides of the shaft, two pistons in each cylinder, each piston having its rod connected to one end of one of the chairs, and means for controlling the supply of motive fluid to and its exhaust from each of said cylinders; substantially as described.

6. In an elevator, the combination with the shaft and the car movable therein, of a pair of landing chairs mounted opposite each other on opposite sides of the shaft and each consisting of a pair of pivotally mounted dogs, the free ends of which have curved faces, a bar to which the free ends of said dogs are secured, a pair of cylinders mounted on opposite sides of the shaft between the ends of the bars of the two chairs, a pair of pistons in each cylinder, each having its rod connected to the end of one of the chairs, two springs in each cylinder between the pistons therein and the ends of the cylinder for moving the chairs to their operative position for supporting the car, and means for supplying compressed air to the cylinders between the pistons therein for operating the pistons against the tension of the springs to move the chairs about their pivots to carry their free ends to inoperative positions out of the path of movement of the car in the shaft; substantially as described.

7. In an elevator, the combination with the shaft and the car movable therein, of a movable landing chair for supporting the car at a landing and arranged to be moved from a car-supporting position into a non-supporting position with respect to the car, a cylinder, a piston mounted within said cylinder and operatively connected to said landing chair, means for admitting a motive fluid to said cylinder for causing said piston to move said chair from its car-supporting position into its non-supporting position with respect to the car, and means associated with said piston and coöperating therewith for automatically returning said chair to its car-supporting position upon the exhaust of the motive fluid from said cylinder; substantially as described.

8. In an elevator, the combination with the shaft and the car movable therein, of a pair of movable landing chairs mounted opposite each other and arranged to occupy a position for supporting the car at a landing and to be moved to a non-supporting position with respect to the car, a cylinder, a pair of pistons mounted within said cylinder and operatively connected to said chairs, a pair of springs associated with said pistons for normally maintaining said chairs in their car-supporting positions, and means for admitting a motive fluid to said cylinder for causing said pistons to move said chairs to their non-supporting positions with respect to the car; substantially as described.

In testimony whereof I affix my signature.

WALTER O. BORCHERDT.

Copies of this patent may be obtained for five cents each, by addressing the "Commissioner of Patents, Washington, D. C."